United States Patent
Neumann et al.

(10) Patent No.: US 11,585,325 B2
(45) Date of Patent: Feb. 21, 2023

(54) METHOD AND SYSTEM FOR COOLING A WIND TURBINE GEARBOX OIL HEAT-EXCHANGER

(71) Applicant: General Electric Company, Schenectady, NY (US)

(72) Inventors: Ulrich Werner Neumann, Simpsonville, SC (US); Mark Steven Pape, Scotia, NY (US)

(73) Assignee: General Electric Company, Schenectady, NY (US)

( * ) Notice: Subject to any disclaimer, the term of this patent is extended or adjusted under 35 U.S.C. 154(b) by 294 days.

(21) Appl. No.: 17/082,274

(22) Filed: Oct. 28, 2020

(65) Prior Publication Data

US 2022/0128041 A1    Apr. 28, 2022

(51) Int. Cl.
*F03D 80/60* (2016.01)
*F03D 9/25* (2016.01)
*F03D 80/70* (2016.01)
*F03D 80/80* (2016.01)

(52) U.S. Cl.
CPC ............... *F03D 80/60* (2016.05); *F03D 9/25* (2016.05); *F03D 80/70* (2016.05); *F03D 80/88* (2016.05); *F05B 2220/706* (2013.01); *F05B 2260/232* (2013.01); *F05B 2260/601* (2013.01); *F05B 2260/64* (2013.01); *F05B 2260/98* (2013.01)

(58) Field of Classification Search
CPC .......................... F03D 80/60; F05B 2260/601
See application file for complete search history.

(56) References Cited

FOREIGN PATENT DOCUMENTS

| | | | |
|---|---|---|---|
| CN | 110578661 A | 12/2019 | |
| EP | 1440004 B1 | 5/2007 | |
| EP | 2163761 A1 | 3/2010 | |
| EP | 2224130 A2 * | 9/2010 | ............ F03D 80/00 |
| EP | 2546515 A1 * | 1/2013 | ............ F03D 80/60 |
| EP | 2990644 A1 | 3/2016 | |
| WO | WO 2014/192112 A1 | 12/2014 | |

OTHER PUBLICATIONS

Extended European Search Report for EP application No. 21203889,7, dated Mar. 25, 2022.

* cited by examiner

*Primary Examiner* — Richard A Edgar
(74) *Attorney, Agent, or Firm* — Dority & Manning, P.A.

(57) ABSTRACT

A method and system are provided for cooling a heat-exchanger in a wind turbine that has an electric generator with a cooling air flow directed therethrough. Effluent cooling air flow from the electric generator is directed into an air ejector pump and acts as motive air through the air ejector pump. Cold air is drawn into the air ejector pump by the vacuum generated by the motive air moving through the air ejector pump. The heat exchanger is disposed in-line with the cold air flow so that the cold air is drawn through the heat-exchanger, removes heat from the fluid circulated through the heat-exchanger, and becomes heated air that is combined with the motive air and discharged from the nacelle.

19 Claims, 4 Drawing Sheets

METHOD AND SYSTEM FOR COOLING A WIND TURBINE GEARBOX OIL HEAT-EXCHANGER

FIELD

The present disclosure relates in general to wind turbines, and more particularly to a system and method for cooling the heat-exchanger for the gearbox oil in the wind turbine drivetrain.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

With the exception of certain "direct drive" wind turbine designs, modern onshore wind turbine generators generally use a heat-exchanger (also referred to as a "cooler") to cool the gear oil that circulates, lubricates, and cools the gears and bearings internal to the gearbox. The heat generated in the gearbox is roughly equivalent to the mechanical losses of the gearbox. For instance, if the gearbox is 97% efficient, 3% of its rated power is converted to heat. For a 2 MW gearbox, the heat-exchanger would need a capacity for extracting around 60 kW of heat from the oil as it passes through its core.

In order to save costs, there is a trend in the industry to utilize large, passive oil coolers mounted on the roof of the nacelle. Contrary to conventional cooler designs that utilize one or more motor driven fans to move air through its core, a passive oil cooler relies solely on the wind pressure to drive air through its core. This passive design, however, requires the cooler to have a very large cooling surface (several square meters of surface) since they solely rely on the natural airflow through their core to extract sufficient heat from the oil.

Thus, the industry would benefit from a system and method that reduces the size of the gear oil cooler without the need for a fan to draw air through the cooler, which are generally noisy, consume a considerable amount of electric power, and have the added costs of the motor, fan, shrouds, etc.

BRIEF DESCRIPTION

Aspects and advantages of the invention will be set forth in part in the following description, or may be obvious from the description, or may be learned through practice of the invention.

In one aspect, the present disclosure is directed to a method for cooling a heat-exchanger in a wind turbine, such as a gear oil heat-exchanger that cools the gear oil circulated through a gearbox that drives an electric generator. The electric generator has a cooling air flow directed therethrough. The method includes directing effluent cooling air flow from the electric generator into an air ejector pump as using the effluent cooling air as motive air to draw a vacuum in the air ejector pump. Cold air is then drawn into the air ejector pump using the vacuum generated by the motive air. The heat-exchanger is disposed in-line with the cold air flow so that the cold air is drawn through the heat-exchanger, removes heat from the fluid circulated through the heat-exchanger, and becomes heated air. The heated air is then combined with the motive air into a combined air flow and discharged.

In a particular embodiment, the heat-exchanger is a gear oil heat exchanger used to cool the gear oil that is circulated through the gear box.

In certain embodiments, the cold air is drawn through an intake from outside of a nacelle. For example, the intake may be mounted in the roof of the nacelle and the heat-exchanger may be within ducting internal to the nacelle. In an alternate embodiment, the cold air can be drawn from inside the nacelle.

In another embodiment, the cold air intake is mounted on a roof of the nacelle external to the nacelle, wherein the heat exchanger is also mounted external to the nacelle within the intake ducting.

Regardless of location of the intake, ducting can be used between the intake of the cold air and a throat of the air ejector pump, with the heat-exchanger disposed within the duct.

It may be desirable in certain embodiments, to discharge the combined air flow through a vent in the nacelle. The combined air flow may be directed through a diffuser disposed between the air ejector pump and the vent in the nacelle.

The present invention also encompasses a wind turbine generator that includes a tower and a nacelle mounted atop the tower. A gearbox is housed within the nacelle, the gearbox driven by a low speed rotor shaft and driving an electric generator housed within the nacelle. An air ejector pump is in communication with an effluent cooling air flow that is directed through the electric generator, wherein the effluent cooling air flow acts as motive air to draw a vacuum in the air ejector pump. A cold air duct is in communication with the air ejector pump through which cold air is drawn into the air ejector pump by the vacuum generated in the air ejector pump by the motive air. A gear oil heat-exchanger is disposed in the cold air duct such that the cold air is drawn through the gear oil heat-exchanger and removes heat from the gear oil circulated through the gear oil heat-exchanger, becomes heated air, and combines with the motive air into a combined air flow. A discharge path is provided for the combined air flow out of the nacelle.

The wind turbine generator includes an intake disposed to draw the cold air from outside of the nacelle. For example, the intake may be mounted generally flush in a roof of the nacelle. With this embodiment, the heat-exchanger can be disposed within a duct within the interior of the nacelle.

In another embodiment, the intake is mounted external to the nacelle on the roof of the nacelle, wherein the heat-exchanger can be mounted in an intake duct on the roof of the nacelle.

To minimize heat build-up within the nacelle, it may be desired to provide a vent in the nacelle through which the combined air flow is discharged. A diffuser can be disposed between the air ejector pump and the vent in the nacelle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
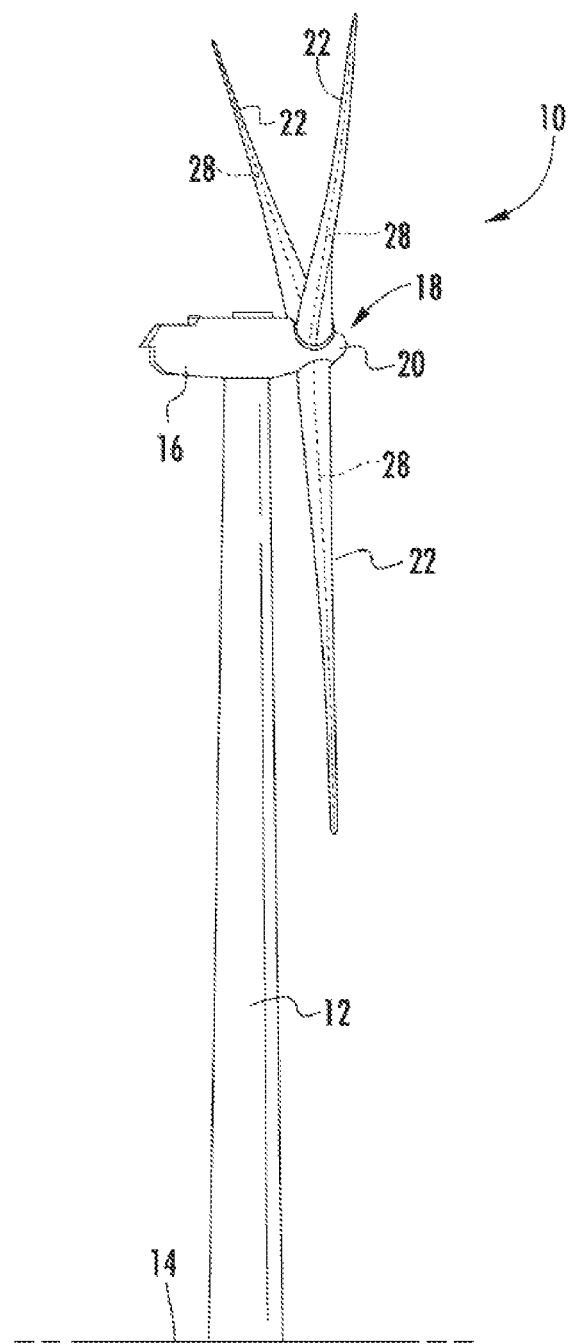
FIG. 1 is a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The electric generators used in most wind turbine generator systems have their own heat-exchange system wherein cooling air is drawn by a fan either directly through the generator or through a so-called air-over-air cooler. In most cases, the heat laden air is typically discharged into the atmosphere through louvers or a vent in the back of nacelle. The volume flow of a large generator is significant, generally in the 3.5-4.0 m³/s range. A principle of the present invention is to use the effluent cooling air from the generator cooling system as "motive air" in an air ejector pump (also referred to as a venturi pump or air educator pump) to create an induced flow of cold air, as explained in greater detail below. Placing a heat exchanger such as the gear oil heat exchanger in the induced cold air flow essentially provides a forced air flow through the heat exchanger without a need for a fan, wherein the forced air flow is considerably larger in volume as compared to a comparable sized heat exchanger (surface area) that is mounted on the roof of the nacelle and exposed to natural air flow.

Thus, a technical advantages of the present method and system is the ability to extract the same amount of heat from the oil (or other fluid in the heat-exchanger) with a much smaller heat-exchanger while using the air flow coming from the electric generator, which is being discharged anyways. All this happens without the need of an additional electric fan to move air through the heat-exchanger. A significant commercial advantage is the cost reduction since the same capacity heat-exchanger is now much smaller and lighter. Also, if the heat exchanger is mounted to the roof of the nacelle, lighter sub-structure in the roof may be used.

Referring now to the drawings, FIG. 1 is a perspective view of one embodiment of a wind turbine 10 according to conventional construction. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotation of the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
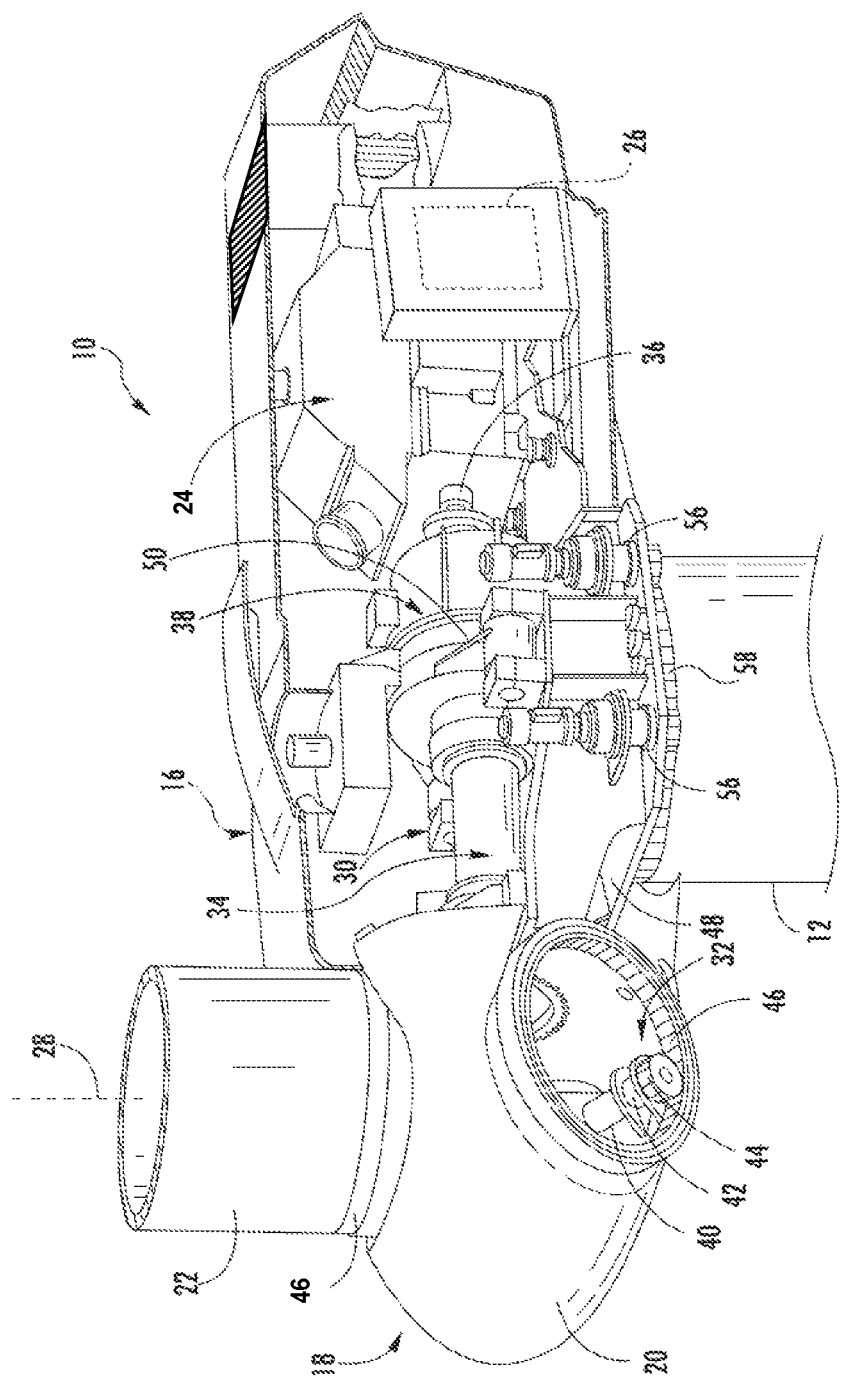
FIG. 2 is a detailed, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, a drivetrain assembly 30 of the wind turbine 10 is housed within the nacelle 16. More specifically, as shown, the drivetrain assembly 30 includes the generator 24, which is coupled to the rotor 18 for producing electrical power from the rotational energy generated by the rotor 18. For example, as shown, the rotor 18 may include a rotor shaft 34 (low speed shaft) coupled to the hub 20 for rotation therewith. The rotor shaft 34 may, in turn, be rotatably coupled to a generator shaft 36 (high speed shaft) of the generator 24 through a gearbox 38 connected to a bedplate support frame 48 by a torque support 50. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

As explained in greater detail below, the gearbox 38 uses a recirculating flow of gear oil to cool and lubricate the various gear components contained therein. The gear oil is circulated through a heat-exchanger to remove heat therefrom before being recirculated back through the gearbox 38.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 56 communicatively coupled to the controller 26, with each yaw drive mechanism(s) 56 being configured to change the angle of the nacelle 16 relative to the wind (e.g., by engaging a yaw bearing 58 of the wind turbine 10).

Figure 3:
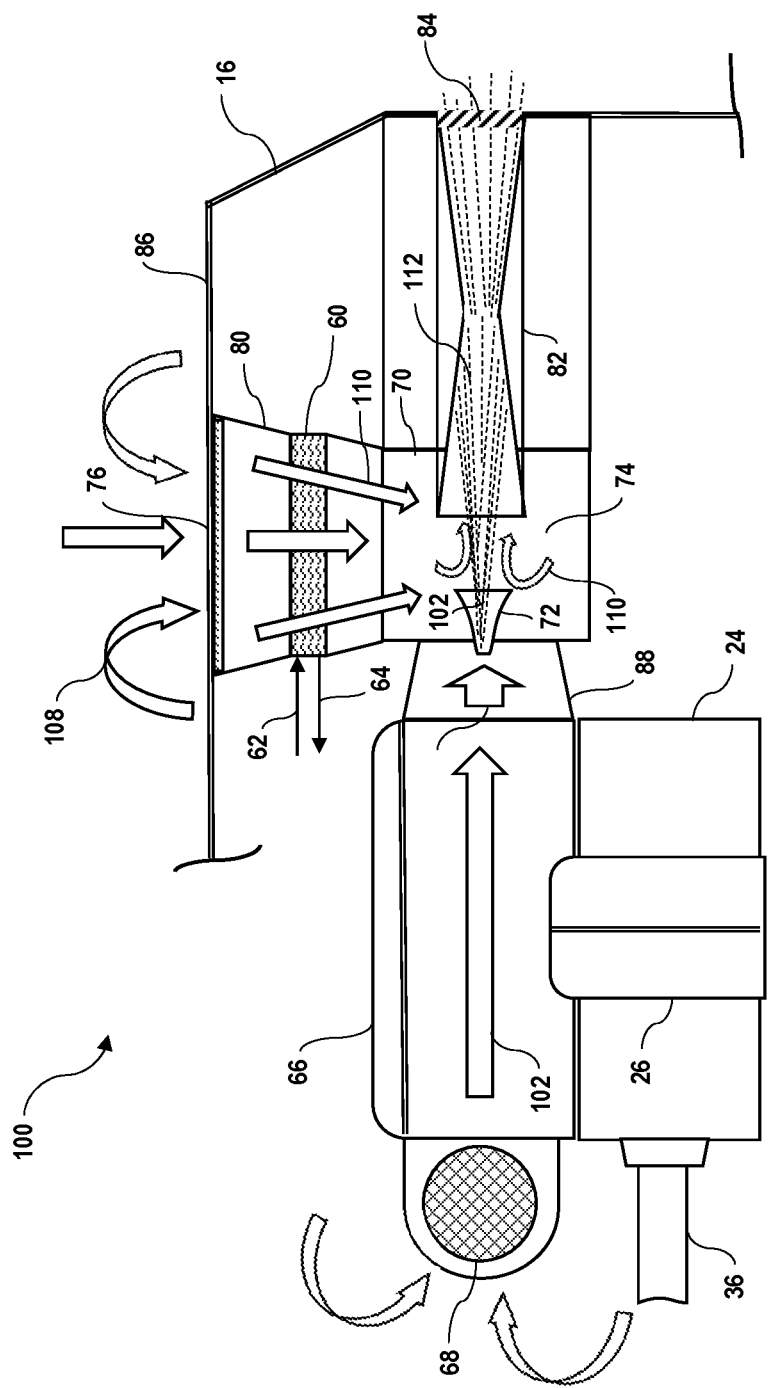
FIG. 3 is a diagram view of an embodiment of a system and method for providing a cooling air flow through a heat-exchanger according to the present disclosure.
Figure 4:
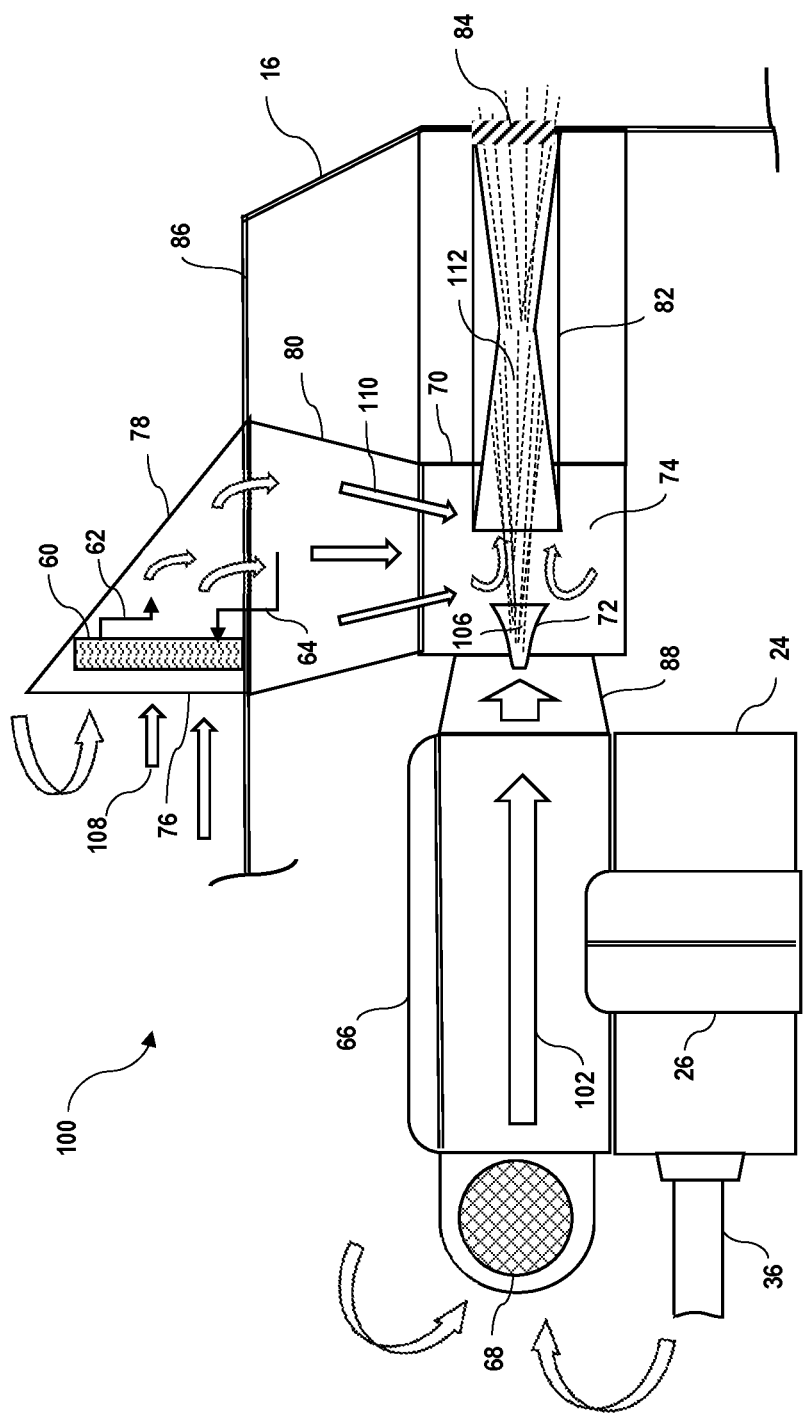
FIG. 4 is a diagram view of an alternate embodiment of a system and method for providing a cooling air flow through a heat-exchanger according to the present disclosure.

Referring now to FIGS. 3-4, embodiments of a method 100 in accordance with the present disclosure are schematically depicted. The method 100 is drawn to cooling a heat-exchanger 60 in a wind turbine drivetrain assembly 30 (FIG. 2), such as a gear oil heat-exchanger 60 that cools the gear oil circulated through the gearbox 38 that drives the electric generator 24. The heat exchanger can be of any conventional forced-air design that uses an air flow passing across fluid conveying conduits (including inlet 62 and outlet 64) to remove heat from the fluid (e.g., oil) circulating through the conduits. The electric generator 24 in most conventional wind turbine drivetrain assemblies utilizes a cooling air flow 102 directed by a fan 66 therethrough, for example in an air-over-air cooler housed in a cabinet 66, to cool the internal components of the generator 24.

The method 100 includes directing effluent cooling air flow 104 from the electric generator 24 (e.g., from the air-over-air cooler in the cabinet 66) through a duct 88 into an air ejector pump 70, wherein the effluent air flow 104 becomes motive air 106 directed through a nozzle 72 to draw a vacuum in a throat area 74 of the air ejector pump 70. The vacuum, in turn, draws cold air 108 into the air ejector pump via a duct 80. In the illustrated embodiments, the air ejector pump is depicted within the nacelle. In alternate embodiments, the air ejector pump can be located outside of the nacelle, for example on the roof of the nacelle.

The heat-exchanger 60 is disposed in-line with the cold air flow 108 so that the cold air is drawn through the heat-exchanger 66, removes heat from the fluid (e.g., gear oil) circulated through the heat-exchanger 66, and becomes heated air 110. The heated air 110 is then combined with the motive air 106 into a combined air flow 112 and discharged.

The cold air 108 may be drawn from inside of the nacelle or outside of the nacelle. In the illustrated embodiments, the cold air is drawn through an intake 76 from outside of the nacelle 16. For example, as depicted in FIG. 3, the intake 76 may be mounted in the roof 86 of the nacelle 16 with the heat-exchanger 66 disposed within ducting 80 that is internal to the nacelle 16.

In the embodiment of FIG. 4, the intake 76 is mounted on the roof 86 of the nacelle 16 external to the nacelle 16, wherein the heat exchanger 66 is also mounted external to the nacelle within intake ducting 78 mounted on the roof 86. In this embodiment, cold air flow 108 through the heat exchanger 66 is augmented by natural air flow (i.e., wind) downstream of the rotor 18 and blades 20 (FIG. 1). Regardless of location of the intake 76, any configuration of internal 80 and external 78 ducting can be used between the cold air intake 76 and the throat area 74 of the air ejector pump 70, with the heat-exchanger 66 disposed within the duct.

It may be desirable in certain embodiments, to discharge the combined air flow 112 through a vent 84 in the nacelle 16 to minimize heat build-up within the nacelle 16. The combined air flow may be directed through a diffuser 82 disposed between the air ejector pump 70 and the vent 84 in the nacelle. The diffuser 82 may have a conventional converging-diverging profile as depicted in FIGS. 3-4.

Although described above with reference to a gear oil heat exchanger 66, it should be appreciated that the method 100 and system may be used to provide a cold air flow to any manner of forced-air heat-exchanger used within the nacelle.

As mentioned, the invention also encompasses a wind turbine 10 (FIGS. 1-2) that utilizes the air ejector pump 70 as described above in communication with an effluent cooling air flow 104 from the electric generator, wherein the effluent cooling air flow 104 acts as motive air 106 to draw a vacuum in the air ejector pump 70. A cold air duct 78, 80 is in communication with the air ejector pump 70 (particularly the throat area 74) through which cold air is drawn into the air ejector pump 70 by the vacuum generated in the air ejector pump 70 by the motive air 106. A heat-exchanger 66 is disposed in the cold air duct 78, 80 such that the cold air 108 is drawn through the heat-exchanger 66 and removes heat from the fluid (e.g., gear oil) circulated through the heat-exchanger 66, becomes heated air 110, and combines with the motive air 106 into a combined air flow 112. A discharge path is provided for the combined air flow 11 out of the nacelle 16, for example through a vent or louver 84 in the nacelle 16.

One skilled in the art, using the disclosures provided herein, will appreciate that various steps or functions of the methods 100 and systems disclosed herein can be omitted, rearranged, combined, and/or adapted in various ways without deviating from the scope of the present disclosure.

Further aspects of the invention are provided by the subject matter of the following clauses:

Clause 1: A method for cooling a gear oil heat-exchanger in a wind turbine that has a gearbox for driving an electric generator, the electric generator having a cooling air flow directed therethrough, the gearbox having a recirculating oil flow therethrough, the method comprising:

directing effluent cooling air flow from the electric generator into an air ejector pump, the effluent cooling air acting as motive air through the air ejector pump;

drawing cold air into the air ejector pump using a vacuum generated by the motive air;

disposing the gear oil heat-exchanger in-line with the cold air flow so that the cold air is drawn through the gear oil heat-exchanger, removes heat from the gear oil circulated through the gear oil heat-exchanger, and becomes heated air; and discharging the heater air and the motive air.

Clause 2: The method as in claim 1, wherein the cold air is drawn through an intake from outside or inside of a nacelle in which the gearbox is housed.

Clause 3: The method as in claim 2, wherein the intake is through a roof of the nacelle, the gear oil heat exchanger mounted internal to the nacelle within the intake.

Clause 4: The method as in claim 2, wherein the intake is mounted on a roof of the nacelle external to the nacelle, the gear oil heat exchanger mounted external to the nacelle within the intake.

Clause 5: The method as in claim 1, wherein a duct is used between an intake of the cold air and a throat of the air ejector pump, the gear oil heat-exchanger disposed within the duct.

Clause 6: The method as in claim 1, wherein the combined air flow is discharged through a vent in a nacelle in which the generator is housed.

Clause 7: The method as in claim 6, comprising passing the combined air flow through a diffuser disposed between the air ejector pump and the vent in the nacelle.

Clause 8: A method for generating a cooling air flow for a heat exchanger used in a wind turbine generator system having an electric generator housed within a nacelle, the method comprising:
generating a cooling air flow through the electric generator;
directing an effluent of the cooling air flow from the electric generator into an air ejector pump, the effluent cooling air flow acting as motive air through the air ejector pump;
drawing cold air into the air ejector pump using a vacuum generated by the motive air; and
directing the cold air drawn into the air ejector pump through the heat exchanger before the cold air is combined with the motive air.

Clause 9: The method as in claim 8, wherein the heat exchanger is a gear oil heat exchanger.

Clause 10: The method as in claim 8, wherein the cold air is drawn through an intake from outside of the nacelle.

Clause 11: The method as in claim 10, wherein the intake is through a roof of the nacelle.

Clause 12: The method as in claim 10, wherein the intake is mounted on a roof of the nacelle external to the nacelle.

Clause 13: A wind turbine, comprising:
a tower;
a nacelle mounted atop the tower;
a gearbox housed within the nacelle, the gearbox driven by a low speed rotor shaft and driving an electric generator housed within the nacelle;
an air ejector pump in communication with an effluent cooling air flow that is directed through the electric generator, wherein the effluent cooling air flow acts as motive air through the air ejector pump;
a cold air duct in communication with the air ejector pump through which cold air is drawn into the air ejector pump by a vacuum generated in the air ejector pump by the motive air;
a gear oil heat-exchanger disposed in the cold air duct such that the cold air moves through the gear oil heat-exchanger and removes heat from the gear oil circulated through the gear oil heat-exchanger, becomes heated air, and combines with the motive air into a combined air flow; and
a discharge path for the combined air flow out of the nacelle.

Clause 14: The wind turbine as in claim 13, further comprising an intake for the cold air that draws the cold air from outside of the nacelle.

Clause 15: The wind turbine as in claim 14, wherein the intake is mounted generally flush in a roof of the nacelle.

Clause 16: The wind turbine as in claim 14, wherein the intake is mounted external to the nacelle on the roof of the nacelle, the gear oil heat-exchanger mounted in the intake on the roof of the nacelle.

Clause 17: The wind turbine as in claim 14, further a duct disposed between the intake and a throat of the air ejector pump, the gear oil heat-exchanger disposed within the duct.

Clause 18: The wind turbine as in claim 13, further comprising a vent in the nacelle through which the combined air flow is discharged.

Clause 19: The wind turbine as in claim 18, further comprising a diffuser disposed between the air ejector pump and the vent in the nacelle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for cooling a gear oil heat-exchanger in a wind turbine that has a gearbox for driving an electric generator, the electric generator having a cooling air flow directed therethrough, the gearbox having a recirculating oil flow therethrough, the method comprising:
directing effluent cooling air flow from the electric generator into an air ejector pump, the effluent cooling air acting as motive air through the air ejector pump;
drawing cold air into the air ejector pump using a vacuum generated by the motive air;
disposing the gear oil heat-exchanger in-line with the cold air flow so that the cold air is drawn through the gear oil heat-exchanger, removes heat from the gear oil circulated through the gear oil heat-exchanger, and becomes heated air; and
discharging the heated air and the motive air.

2. The method as in claim 1, wherein the cold air is drawn through an intake from outside or inside of a nacelle in which the gearbox is housed.

3. The method as in claim 2, wherein the intake is through a roof of the nacelle, the gear oil heat exchanger mounted internal to the nacelle within the intake.

4. The method as in claim 2, wherein the intake is mounted on a roof of the nacelle external to the nacelle, the gear oil heat exchanger mounted external to the nacelle within the intake.

5. The method as in claim 1, wherein a duct is used between an intake of the cold air and a throat of the air ejector pump, the gear oil heat-exchanger disposed within the duct.

6. The method as in claim 1, wherein the combined air flow is discharged through a vent in a nacelle in which the generator is housed.

7. The method as in claim 6, comprising passing the combined air flow through a diffuser disposed between the air ejector pump and the vent in the nacelle.

8. A method for generating a cooling air flow for a heat exchanger used in a wind turbine generator system having an electric generator housed within a nacelle, the method comprising:
generating a cooling air flow through the electric generator;
directing an effluent of the cooling air flow from the electric generator into an air ejector pump, the effluent cooling air flow acting as motive air through the air ejector pump;
drawing cold air into the air ejector pump using a vacuum generated by the motive air; and
directing the cold air drawn into the air ejector pump through the heat exchanger before the cold air is combined with the motive air.

9. The method as in claim 8, wherein the heat exchanger is a gear oil heat exchanger.

10. The method as in claim 8, wherein the cold air is drawn through an intake from outside of the nacelle.

11. The method as in claim 10, wherein the intake is through a roof of the nacelle.

12. The method as in claim 10, wherein the intake is mounted on a roof of the nacelle external to the nacelle.

13. A wind turbine, comprising:
- a tower;
- a nacelle mounted atop the tower;
- a gearbox housed within the nacelle, the gearbox driven by a low speed rotor shaft and driving an electric generator housed within the nacelle;
- an air ejector pump in communication with an effluent cooling air flow that is directed through the electric generator, wherein the effluent cooling air flow acts as motive air through the air ejector pump;
- a cold air duct in communication with the air ejector pump through which cold air is drawn into the air ejector pump by a vacuum generated in the air ejector pump by the motive air;
- a gear oil heat-exchanger disposed in the cold air duct such that the cold air moves through the gear oil heat-exchanger and removes heat from the gear oil circulated through the gear oil heat-exchanger, becomes heated air, and combines with the motive air into a combined air flow; and
- a discharge path for the combined air flow out of the nacelle.

14. The wind turbine as in claim 13, further comprising an intake for the cold air that draws the cold air from outside of the nacelle.

15. The wind turbine as in claim 14, wherein the intake is mounted generally flush in a roof of the nacelle.

16. The wind turbine as in claim 14, wherein the intake is mounted external to the nacelle on the roof of the nacelle, the gear oil heat-exchanger mounted in the intake on the roof of the nacelle.

17. The wind turbine as in claim 14, further a duct disposed between the intake and a throat of the air ejector pump, the gear oil heat-exchanger disposed within the duct.

18. The wind turbine as in claim 13, further comprising a vent in the nacelle through which the combined air flow is discharged.

19. The wind turbine as in claim 18, further comprising a diffuser disposed between the air ejector pump and the vent in the nacelle.

* * * * *